United States Patent
Oda (10) Patent No.: US 8,446,448 B2
(45) Date of Patent: May 21, 2013

(54) OPTICAL SCANNING UNIT AND IMAGE FORMING APPARATUS PROVIDED WITH THE SAME

(75) Inventor: Ayumu Oda, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 31 days.

(21) Appl. No.: 13/170,002

(22) Filed: Jun. 27, 2011

(65) Prior Publication Data

US 2011/0317426 A1      Dec. 29, 2011

(30) Foreign Application Priority Data

Jun. 28, 2010    (JP) .................................. 2010-145794

(51) Int. Cl.
*B41J 15/14*    (2006.01)
*B41J 27/00*    (2006.01)

(52) U.S. Cl.
USPC .......................................... 347/242; 347/257

(58) Field of Classification Search
USPC .................. 347/230, 241–244, 256–261, 263
See application file for complete search history.

(56) References Cited

U.S. PATENT DOCUMENTS

| 7,151,557 | B2 * | 12/2006 | Boyatt et al. | 347/252 |
| 2007/0115615 | A1 * | 5/2007 | Hamatani | 361/600 |
| 2011/0007125 | A1 * | 1/2011 | Matsuura | 347/224 |

FOREIGN PATENT DOCUMENTS

| JP | 11-64765 A | | 3/1999 |
| JP | 11242147 A | * | 9/1999 |
| JP | 11-352432 A | | 12/1999 |
| JP | 11352432 A | * | 12/1999 |
| JP | 2000-35546 A | | 2/2000 |
| JP | 2005-176051 A | | 6/2005 |
| JP | 2007-3594 A | | 1/2007 |
| JP | 2007-45094 A | | 2/2007 |
| JP | 2007-121341 A | | 5/2007 |
| JP | 2008034043 A | * | 2/2008 |
| JP | 2008-145953 A | | 6/2008 |
| JP | 2009217864 A | * | 9/2009 |

* cited by examiner

*Primary Examiner* — Hai C Pham
(74) *Attorney, Agent, or Firm* — Birch, Stewart, Kolasch & Birch, LLP (57) ABSTRACT

With a configuration for adhering and fixing a laser diode holder to a holding portion, sufficient supporting strength of the laser diode holder is given without unnecessarily increasing an amount of an adhesive agent and a solidification time of the adhesive agent. The adhesive agent is applied so as to couple an outer circumferential surface of the laser diode holder and a wall surface of an opening provided in a housing. Here, one or both of the outer circumferential surface of the laser diode holder and the wall surface of the opening of the housing has a recess at a portion to which the adhesive agent is applied. The recess has such a shape that an inner side of an outer edge is concaved, and the outer edge at least partially has a shape extending toward a coupling portion between the laser diode holder and the housing.

18 Claims, 13 Drawing Sheets

FIG.13

# OPTICAL SCANNING UNIT AND IMAGE FORMING APPARATUS PROVIDED WITH THE SAME

CROSS-NOTING PARAGRAPH

This non-provisional application claims priority under 35 U.S.C. §119(a) on Patent Application No. 2010-145794 filed in JAPAN on Jun. 28, 2010, the entire contents of which are hereby incorporated herein by reference.

BACKGROUND OF THE INVENTION

1. Field of the Invention

The present invention relates to an optical scanning unit and an image forming apparatus provided with the optical scanning unit, and more specifically, to a configuration of a member for arranging an optical part such as a laser diode at a desired position using an ultraviolet curable resin adhesive in an optical scanning unit. In particular, the present invention relates to a technology for arranging a laser diode in a laser scanning unit of an image forming apparatus such as a copier.

2. Description of the Related Art

An optical scanning unit that scans a laser beam is used for an image forming apparatus such as a digital copier, a laser printer, or a facsimile. When an image is formed in the image forming apparatus, after a photoreceptor is charged by a charging unit, writing according to image information is performed by the optical scanning unit and an electrostatic latent image is formed on the photoreceptor. The electrostatic latent image on the photoreceptor is then visualized by a toner supplied from a developing unit. The toner image visualized on the photoreceptor is transferred onto recording paper by a transfer unit and is fixed on the recording paper by a fixing unit, thereby obtaining a desired image.

A laser diode serving as a light source of the optical scanning unit is attached to a predetermined holding portion. As the holding portion, for example, a wall portion of a housing serving as a housing of the optical scanning unit is applied. In this case, such a configuration is employed that a laser diode holder provided with the laser diode is used and the laser diode holder is fixed to the above holding portion. For example, the laser diode holder is attached to an opening provided in the holding portion, and after three-dimensionally adjusting the position of the laser diode, the laser diode holder is adhered and fixed to the holding portion. In this case, by applying an adhesive agent so as to couple an outer circumferential surface of the laser diode holder and a wall surface of the opening of the holding portion, the laser diode holder is fixed to the holding portion.

Concerning a configuration for adhering and fixing a laser diode in an optical scanning unit, for example, Japanese Laid-Open Patent Publication No. 2005-176051 discloses such a configuration for attaching a laser diode to a laser diode holder that the laser diode is fallen into a part of a counterbore provided in an opening of the laser diode holder through an auxiliary member, and after adjusting the position of the laser diode, an adhesive agent is injected into a gap between the auxiliary member and the counterbore to fix the laser diode.

As described above, when fixing the laser diode holder and the holding portion using the adhesive agent, conventionally, by applying the adhesive agent so as to couple the outer circumferential surface of the laser diode holder and the wall surface of the opening of the holding portion, the laser diode holder is fixed.

However, when performing adhering and fixing with such a configuration, a phenomenon occurs that due to surface tension, the adhesive agent that is bridged between the outer circumferential surface of the laser diode holder and the wall surface of the opening of the holding portion has an hourglass shape and a center part thereof is constricted and thinned. In this case, stress is focused on the thinned center part of the adhesive agent so that adhesive strength may be reduced to be insufficient. In order to prevent such a phenomenon, it has been necessary to give required strength by increasing an amount of the adhesive agent or lengthening a time to irradiate an ultraviolet curing type adhesive agent with ultraviolet rays.

SUMMARY OF THE INVENTION

An object of the present invention is to provide an optical scanning unit having a configuration for adhering and fixing a laser diode holder serving as an optical part to a holding portion, which is configured so as to ensure sufficient supporting strength of the laser diode holder without unnecessarily increasing an amount of an adhesive agent and a solidification time of the adhesive agent, and an image forming apparatus provided with the optical scanning unit.

Another object of the present invention is to provide an optical scanning unit comprising a laser diode holder to which a laser diode is fixed and a holding portion for holding the laser diode holder, in which the laser diode holder is fixed to the holding portion by applying an adhesive agent to couple an outer circumferential surface of the laser diode holder and a wall surface of an opening provided in the holding portion, wherein one or both of the outer circumferential surface of the laser diode holder and the wall surface of the opening has a recess at a portion to which the adhesive agent is applied, the recess has such a shape that an inner side of an outer edge of the recess is concaved into the outer edge, and the outer edge at least partially has a shape extending toward a coupling portion between the laser diode holder and the holding portion, and the adhesive agent is applied to the recess.

Another object of the present invention is to provide the optical scanning unit, wherein the outer edge has a shape surrounded by a curved line.

Another object of the present invention is to provide the optical scanning unit, wherein the outer edge has a shape formed by using at least straight lines including at least two sides of a triangle.

Another object of the present invention is to provide the optical scanning unit, wherein the outer edge has a shape formed by using at least straight lines including at least three sides of a trapezoid.

Another object of the present invention is to provide the optical scanning unit, wherein the recess is provided in both of the outer circumferential surface of the laser diode holder and the wall surface of the opening of the holding portion, and a shape of the recess provided in the outer circumferential surface of the laser diode holder and a shape of the recess provided in the wall surface of the opening of the holding portion are the same.

Another object of the present invention is to provide the optical scanning unit, wherein at least a part of the laser diode holder, and/or at least a part of the holding portion is made of a transparent material.

Another object of the present invention is to provide the optical scanning unit, wherein all angles formed by respective adjacent straight lines among straight lines connecting a light emitting point of the laser diode fixed to the laser diode holder and each center of the recesses are the same.

Another object of the present invention is to provide the optical scanning unit, wherein the recess is provided at a position intersecting a surface which includes a light emitting point of the laser diode and which is orthogonal to a light axis of light flux emitted from the laser diode.

Another object of the present invention is to provide an image forming apparatus comprising the optical scanning unit.

DETAILED DESCRIPTION OF THE INVENTION

Figure 1:
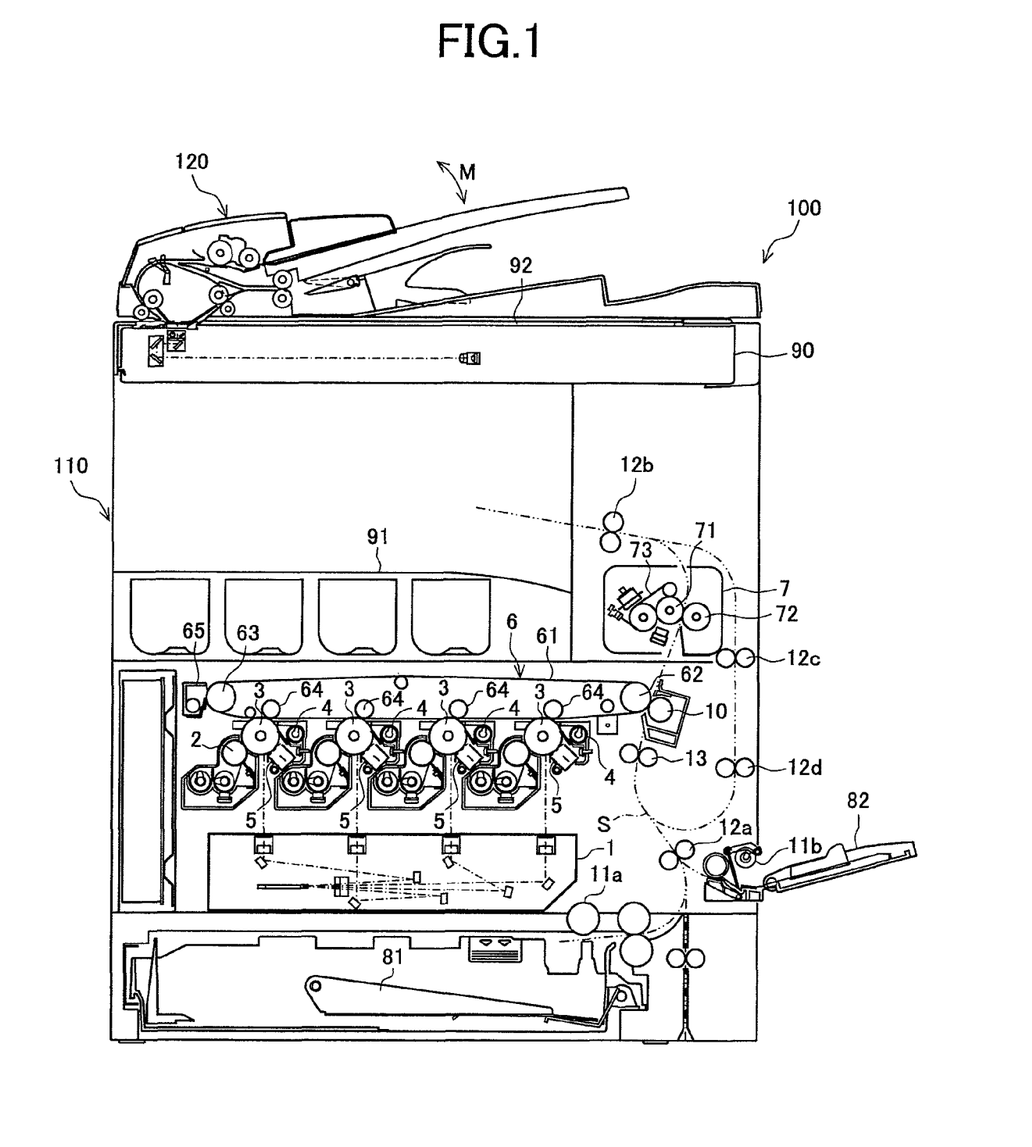
FIG. 1 is a view showing an exemplary configuration of an image forming apparatus for which an optical scanning unit according to the present invention is used.

FIG. 1 is a view showing an exemplary configuration of an image forming apparatus for which an optical scanning unit according to the present invention is used. An image forming apparatus 100 forms a multi-color or single-color image on a predetermined sheet (recording paper) in accordance with image data transmitted from outside, and is comprised of a main apparatus body 110 and an automatic document feeder 120. The main apparatus body 110 is formed to include an optical scanning unit (exposure unit) 1, a developer 2, photoreceptor drums 3, a cleaner unit 4, a charger 5, an intermediate transfer belt unit 6, a fixing unit 7, a paper feed cassette 81, a paper discharge tray 91, and the like.

At an upper portion of the main apparatus body 110, a document platen 92 comprised of a transparent glass for placing a document is provided, and above the document platen 92, the automatic document feeder 120 is equipped. The automatic document feeder 120 automatically feeds a document onto the document platen 92. Moreover, the automatic document feeder 120 is configured to freely rotate in the direction of an arrow M, allowing the document to be manually placed on the document platen 92 by exposing the top surface of the document platen 92.

Image data to be dealt with by the present image forming apparatus corresponds to color images using respective colors of black (K), cyan (C), magenta (M) and yellow (Y). Accordingly, four sets of the developer 2, the photoreceptor drums 3, the charger 5 and the cleaner unit 4 are provided to form four kinds of latent images corresponding to the respective colors, thus, four image stations are formed so as to be set with black, cyan, magenta and yellow, respectively.

The charger 5 is a charging means for uniformly charging the surface of the photoreceptor drums 3 to a predetermined electric potential, and contact-type chargers including roller-type chargers and brush-type chargers may be used in addition to the charger-type one shown in FIG. 1.

The optical scanning unit 1 is configured as a laser scanning unit (LSU) provided with a laser emitting portion, reflection mirrors, and the like. In the optical scanning unit 1, a polygon mirror for scanning the laser beam, optical elements such as lenses and mirrors for leading the laser beam reflected off the polygon mirror to the photoreceptor drums 3 are arranged. In addition, for the optical scanning unit 1, other methods using an array of light emitting elements such as an EL or LED writing head may be employed instead.

The optical scanning unit 1 has a function of forming an electrostatic latent image corresponding to the image data on the surface of the charged photoreceptor drums 3 by exposing each of the charged photoreceptor drums 3 in accordance with input image data. The developers 2 visualize the electrostatic latent images formed on the surface of the photoreceptor drums 3 using four color (YMCK) toners, respectively. Moreover, the cleaner units 4 remove and collect the toner remained on the surface of the photoreceptor drums 3 after development and image transfer.

The intermediate transfer belt unit 6 arranged over the photoreceptor drums 3 is provided with an intermediate transfer belt 61, an intermediate transfer belt driving roller 62, an intermediate transfer belt driven roller 63, an intermediate transfer roller 64, and an intermediate transfer belt cleaning unit 65. Four intermediate transfer rollers 64 described above are provided corresponding to respective YMCK colors.

The intermediate transfer belt driving roller 62, the intermediate transfer belt driven roller 63, and the intermediate transfer roller 64 are for driving and rotating the intermediate transfer belt 61 suspended therearound. Each of the intermediate transfer rollers 64 applies transfer bias for transferring the toner image on the photoreceptor drums 3 to the intermediate transfer belt 61.

The intermediate transfer belt 61 is arranged to be in contact with each of the photoreceptor drums 3, and has a function of forming a color toner image (multi-color toner image) on the intermediate transfer belt 61 by transferring the toner images of respective colors formed on the photoreceptor drums 3 to the intermediate transfer belt 61 one on top of the other. The intermediate transfer belt 61 is formed into an endless shape, for example, using a film having the thickness of about 100 μm to 150 μm.

Transfer of the toner image from the photoreceptor drums 3 to the intermediate transfer belt 61 is performed by the intermediate transfer roller 64 that is in contact with the rear side of the intermediate transfer belt 61. High-voltage transfer bias (high voltage of a polarity (+) opposite to the charging polarity (−) of the toner) is applied to the intermediate transfer roller 64, in order to transfer the toner image. The intermediate transfer roller 64 is a roller that has, as a base, a metal shaft (for example, of stainless steel) having the diameter of 8 to 10 mm, with its surface covered with a conductive elastic material (for example, EPDM, foamed urethane or the like). The conductive elastic material makes it possible to apply high voltage uniformly to the intermediate transfer belt 61. Though a roller-shaped transfer electrode is used here, brushes and the like are also usable instead.

As described above, the electrostatic images visualized according to respective color hues on the respective photoreceptor drums 3 are laminated on the intermediate transfer belt 61. The image information laminated in this manner is transferred onto the paper as the intermediate transfer belt 61 rotates, by a transfer roller 10 described below that is arranged at the contact position between the paper and the intermediate transfer belt 61.

At this time, the intermediate transfer belt 61 and the transfer roller 10 are pressed against each other with a predetermined nip while voltage for transferring the toner to the paper (high voltage of a polarity (+) opposite to the charging polarity (−) of the toner) is applied to the transfer roller 10. Further, in order to constantly obtain the above nip, one of the transfer roller 10 and the above intermediate transfer belt driving roller 62 is formed of a hard material (metal or the like) while the other is formed of a soft material such as an elastic roller or the like (an elastic rubber roller, a foamed resin roller etc.).

In addition, since the toner adhered to the intermediate transfer belt 61 due to the contact with the photoreceptor drums 3, or the toner which has not been transferred by the transfer roller 10 to the paper and remains on the intermediate transfer belt 61 as described above causes color contamination of toners at the next step, such toner is removed and collected by the intermediate transfer belt cleaning unit 65. The intermediate transfer belt cleaning unit 65 is provided with, for example, a cleaning blade as a cleaning member that comes in contact with the intermediate transfer belt 61 and the intermediate transfer belt 61 is supported from its interior side by the intermediate transfer belt driven roller 63, at the portion where the cleaning blade comes in contact with the belt.

The paper feed cassette 81 is a tray for stacking sheets (recording paper) to be used for image formation and is provided under the optical scanning unit 1 of the main apparatus body 110. In addition, it is also possible to place sheets used for image formation on a manual paper feed cassette 82. Moreover, the paper discharge tray 91 equipped in the upper part of the main apparatus body 110 is a tray on which the printed sheets are collected facedown.

The main apparatus body 110 is further provided with a paper feed path S that is formed into an approximately vertical shape to convey the sheet from the paper feed cassette 81 and the manual paper feed cassette 82 to the paper discharge tray 91 by way of the transfer roller 10 and the fixing unit 7. Near the paper feed path S from the paper feed cassette 81 or the manual paper feed cassette 82 to the paper discharge tray 91, pickup rollers 11a and 11b, a plurality of feed rollers 12a to 12d, a registration roller 13, the transfer roller 10, the fixing unit 7 and the like are arranged.

The feed rollers 12a to 12d are small rollers for promoting and supporting conveyance of sheets and are equipped at different positions along the paper feed path S. In addition, the pickup roller 11a is arranged near the end of the paper feed cassette 81 so as to pick up the sheet one by one from the paper feed cassette 81 and supply the sheet to the paper feed path S. Similarly, the pickup roller 11b is equipped near the end of the manual paper feed cassette 82 so as to pick up the sheet one by one from the manual paper feed cassette 82 and supply the sheet to the paper feed path S.

Next, the configuration of the laser scanning unit (LSU) serving as the optical scanning unit of the image forming apparatus will be further described. A general LSU of an image forming apparatus is one which is widely known to the person skilled in the art. A color LSU will be roughly described below.

Figure 2A:
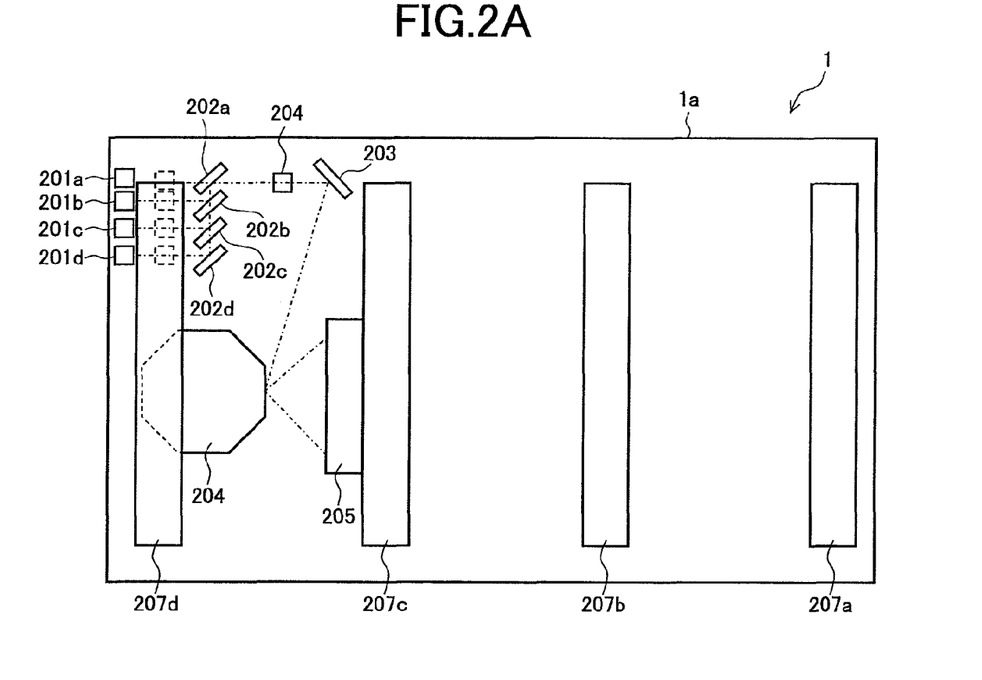
FIGS. 2A and 2B are plane and side configuration views showing an embodiment of the optical scanning unit according to the present invention.
Figure 2B:
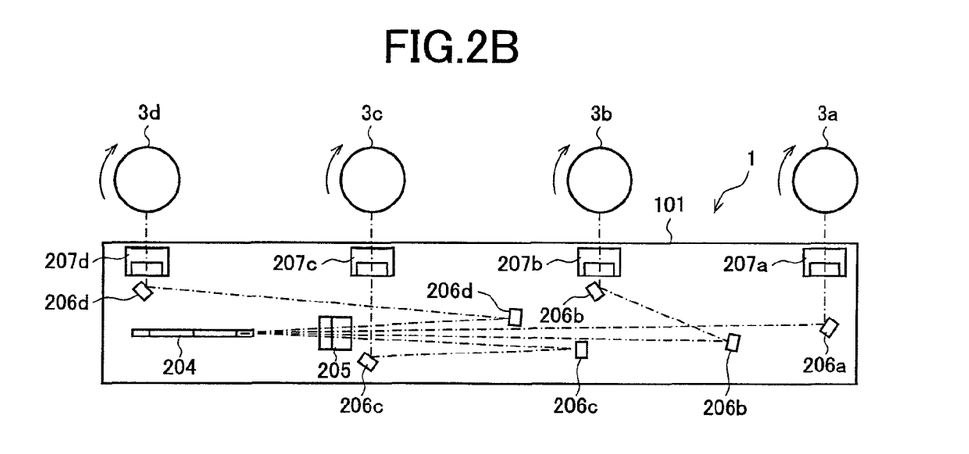
Figure 3:
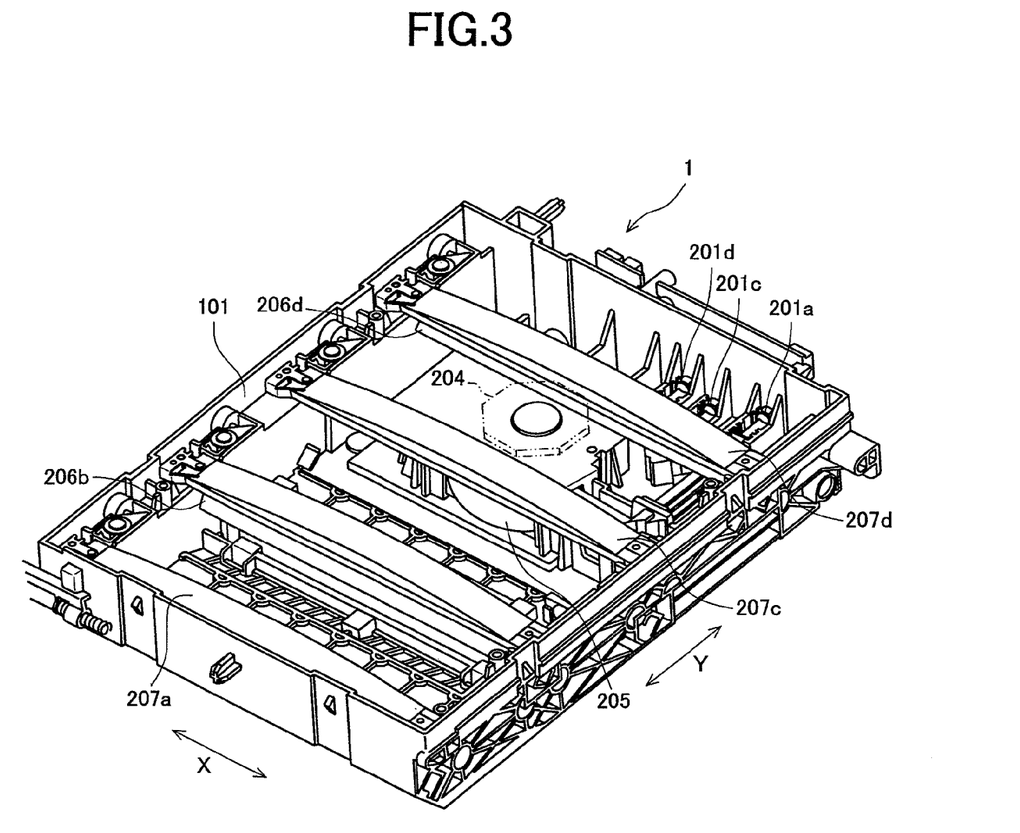
FIG. 3 is a perspective view of an embodiment of the optical scanning unit according to the present invention.

FIGS. 2A and 2B are plane and side configuration views showing an embodiment of the optical scanning unit according to the present invention, and FIG. 3 is a perspective view of the optical scanning unit. In the optical scanning unit of this embodiment, respective laser diodes 201 (201a, 201b, 201c, and 201d) that correspond to respective colors of black (K), cyan (C), magenta (M), and yellow (Y); mirrors 202 (202a, 202b, 202c, and 202d) that reflect laser beams of the respective laser diodes 201a to 201d; a mirror 203 that reflects the respective laser beams from the mirrors 202a to 202d; a rotating polygon mirror (hereinafter referred to as a polygon mirror) 204 that reflects the respective laser beams from the mirror 203; a first f-theta lens 205 that refracts the respective laser beams from the polygon mirror 204; a plurality of mirrors 206 (206a, 206b, 206c, and 206d) that separately reflect the respective laser beams that have permeated the first f-theta lens 205; and four second f-theta lenses 207 (207a, 207b, 207c, and 207d) that separately refract the respective laser beams from the respective mirrors 206a to 206d are arranged at predetermined positions within a housing 101.

The polygon mirror 204 has an eight-sided regular polygonal column shape, and is driven to rotate at high speed, so that respective laser beams are reflected by mirrors (reflective faces) of respective circumferential faces and repeatedly scanned in a main scanning direction X.

In order to reflect and refract the respective laser beams that are repeatedly scanned in the main scanning direction X, the first f-theta lens 205, the mirrors 206, and the second f-theta lenses 207 are formed in a bar-like shape that is made longer in the main scanning direction X, and made shorter in the direction orthogonal to the main scanning direction X, and both ends of them are supported and fixed to the housing 101.

The laser beam emitted from the laser diode 201c that corresponds to black is sequentially reflected by the mirror 202c, the mirror 202a and the mirror 203, and is reflected by the polygon mirror 204 and scanned in the main scanning direction X. Furthermore, the laser beam permeates the first f-theta lens 205, is reflected by the mirror 206a, permeates the second f-theta lens 207a, and enters the photoreceptor drums 3a that corresponds to black.

The laser beam emitted from the laser diode 201d that corresponds to cyan is sequentially reflected by the mirror 202d, the mirror 202a and the mirror 203, and is reflected by the polygon mirror 204 and scanned in the main scanning direction X. Furthermore, the laser beam permeates the first f-theta lens 205, is reflected by the two mirrors 206b, permeates the second f-theta lens 207b, and enters the photoreceptor drums 3b that corresponds to cyan.

The laser beam emitted from the laser diode 201b that corresponds to yellow is sequentially reflected by the mirrors 202b and 202a and the mirror 203, and is reflected by the polygon mirror 204 and scanned in the main scanning direction X. Furthermore, the laser beam permeates the first f-theta lens 205, is reflected by the two mirrors 206d, permeates the second f-theta lens 207d, and enters the photoreceptor drums 3d that corresponds to yellow.

The laser beam emitted from the laser diode 201a that corresponds to magenta is reflected by the mirror 203, reflected by the polygon mirror 204 and scanned in the main scanning direction X. Furthermore, the laser beam permeates the first f-theta lens 205, is reflected by the two mirrors 206c, permeates the second f-theta lens 207c, and enters the photoreceptor drums 3c that corresponds to magenta.

The respective photoreceptor drums 3a to 3d are rotationally driven in the direction of the arrow shown in FIG. 2B, and are irradiated with the respective laser beams that are repeatedly scanned in the main scanning direction X, and respective electrostatic latent images are formed on the surface of the respective photoreceptor drums 3a to 3d. The electrostatic latent images on the surface of the respective photoreceptor drums 3a to 3d are developed to become toner images, and these toner images are stacked and transferred to recording paper through the intermediate transfer belt 61 to become a color toner image on the recording paper.

Figure 4:
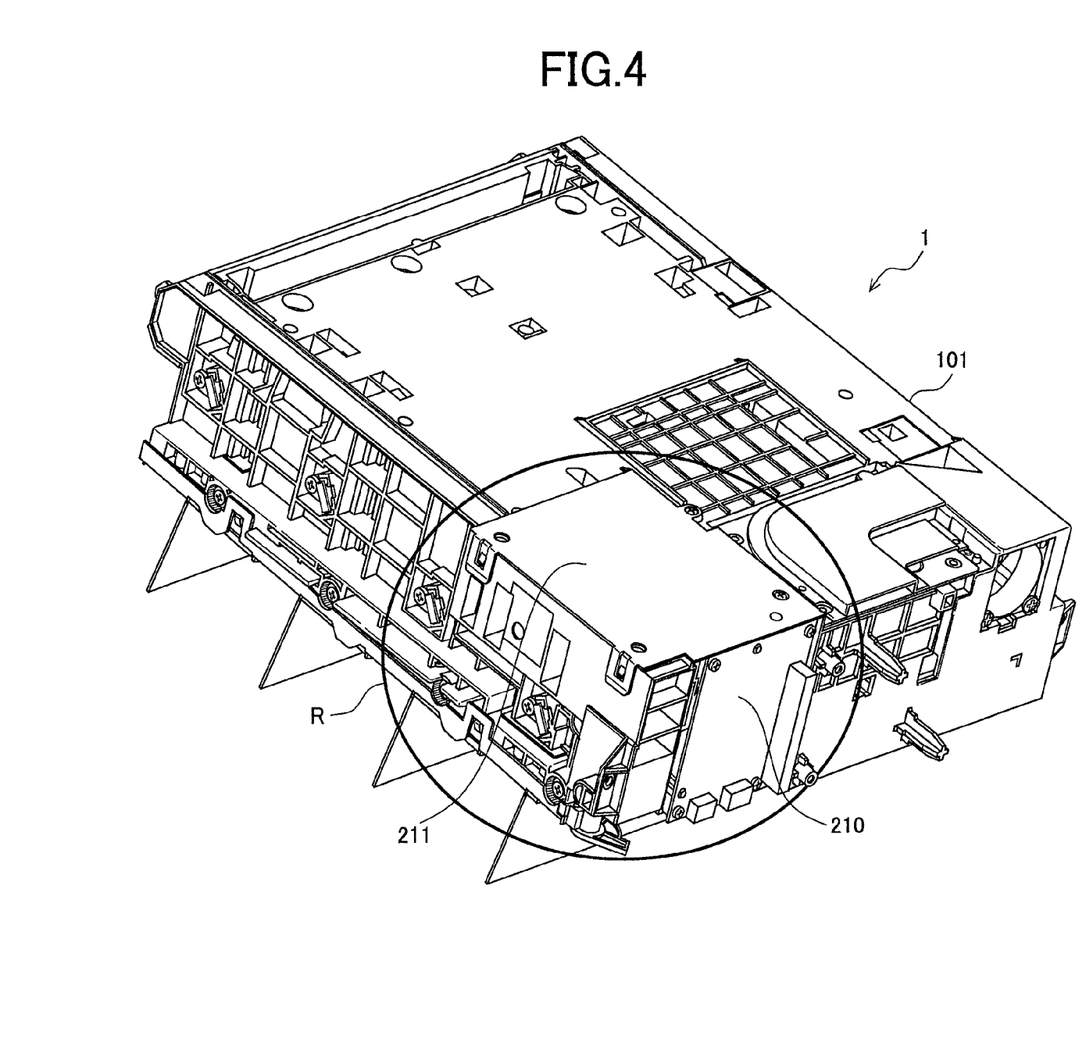
FIG. 4 is another view showing a configuration of an embodiment of the optical scanning unit according to the present invention and is an external view of a housing of FIGS. 2A and 2B viewed from a downward diagonal.

FIG. 4 is another view showing a configuration of an embodiment of the optical scanning unit according to the present invention and is an external view of the housing of FIGS. 2A and 2B viewed from a downward diagonal.

In FIG. 4, a light source portion serving as a primary optical system for delivering light flux emitted from laser diodes to a polygon motor is provided in the inside of the housing 101 of the optical scanning unit 1. Each laser diode (LD) is lit and driven by a not-shown laser driving circuit provided in an LD lighting control board 210. Moreover, to the light source portion, a light source portion cover 211 for preventing the entrance of dust is attached, and inside of which optical elements constituting the light source portion are arranged.

Figure 5:
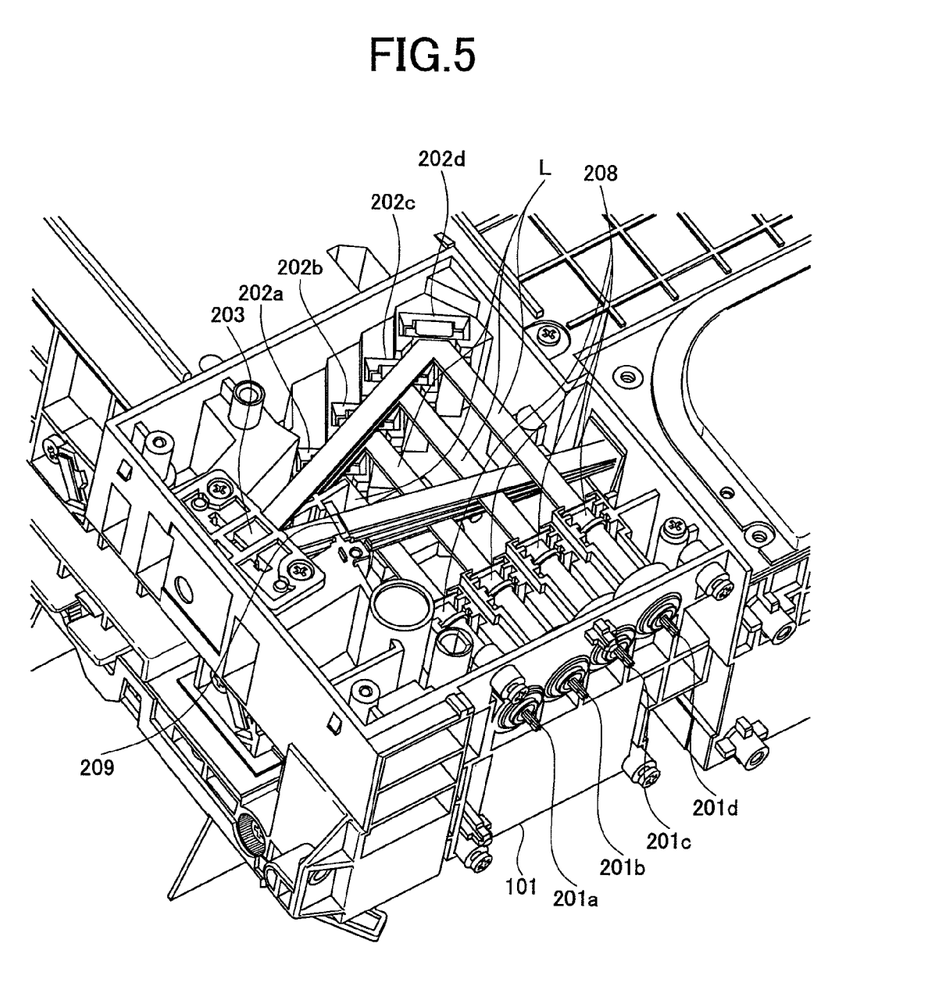
FIG. 5 is a view showing an internal configuration of a main part of the housing shown in FIG. 4.

FIG. 5 is a view showing an internal configuration of a main part (vicinity of an area shown by R) of the housing shown in FIG. 4 and shows the optical elements in a state where the light source portion cover shown in FIG. 4 is removed. In the light source portion, respective laser diodes (LDs) 201a to 201d that correspond to respective colors of black (K), cyan (C), magenta (M), and yellow (Y) and mirrors 202a to 202d and 203 that totally reflect laser light flux L emitted from the respective laser diodes 201a to 201d are arranged, and in the mirror 203, all the light flux is totally reflected and emitted from the light source portion, followed by travelling toward the polygon mirror.

The laser diodes 201a to 201d are attached to a wall portion of the housing 101 of the optical scanning unit 1. On the laser beam emitting side of each of the laser diodes 201a to 201d, a collimator lens 208 is arranged. The light flux emitted from each of the laser diodes 201a to 201d is diffusion light which has nearly elliptical shape and is converted to parallel light by each of the collimator lenses 208. After each of the collimator lenses 208, an aperture (slit) with a predetermined gap is arranged to regulate the diameter of the light flux.

Moreover, in the light source portion, a cylindrical lens 209 for focusing each light flux L on the polygon mirror in the sub-scanning direction is provided on the optical path after the mirror 203.

Note that, though the arrangement of the mirrors of the light source portion shown in FIG. 5 is different from that of the mirrors schematically shown in FIGS. 2A and 2B, in either case, the light source portion is arranged with mirrors 202a to 202d and 203 that deliver the light flux L emitted from the laser diodes 201a to 201d to the polygon mirror. Further, the number of mirrors and the arrangement configuration thereof are not limited to those examples.

Figure 6A:
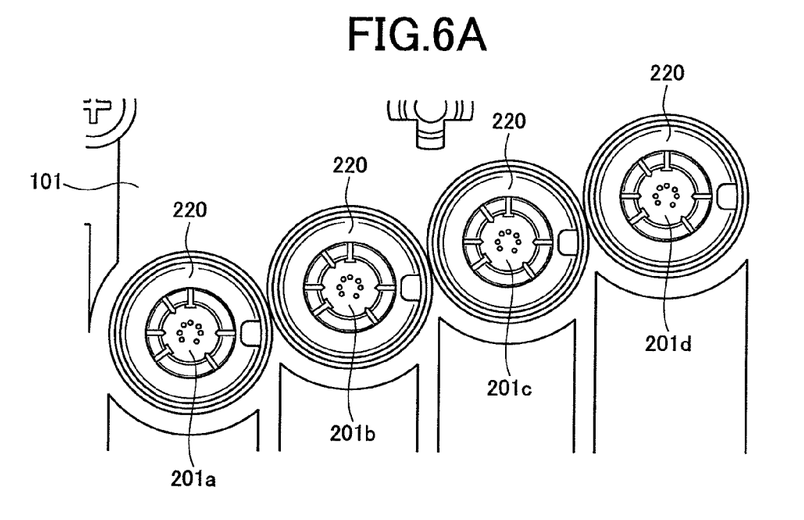
FIGS. 6A and 6B are views for explaining an arrangement configuration of laser diodes.
Figure 6B:
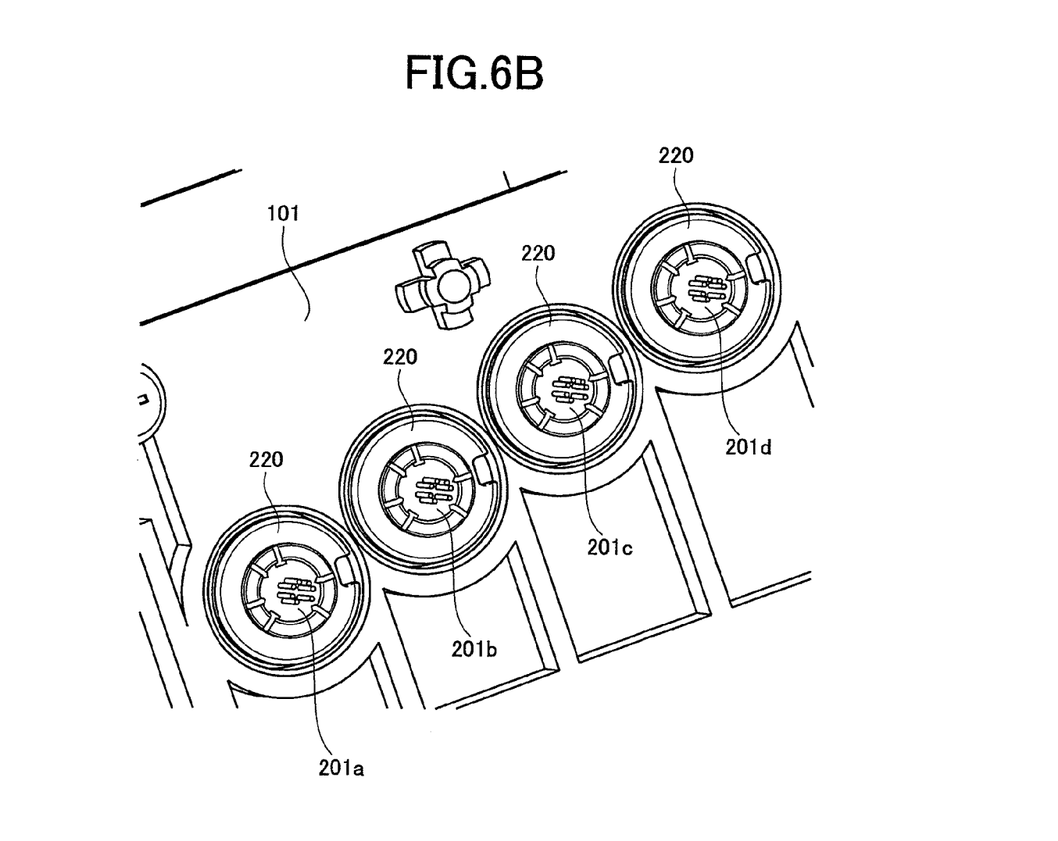

FIGS. 6A and 6B are views for explaining an arrangement configuration of laser diodes, where FIG. 6A is a front view of a main part of the housing provided with the laser diodes and FIG. 6B is a perspective view thereof.

The respective laser diodes (LDs) 201a to 201d that correspond to respective colors of K, C, M, and Y are attached to the housing 101 configured as a housing of the optical scanning unit. In this case, the respective laser diodes 201a to 201d are attached at different heights in the sub-scanning direction of the optical scanning unit. Each of the laser diodes 201a to 201d is attached to the opening provided in the housing 101 using a laser diode (LD) holder 220. The housing 101 corresponds to a holding portion of the present invention for holding the laser diode holder.

Figure 7:
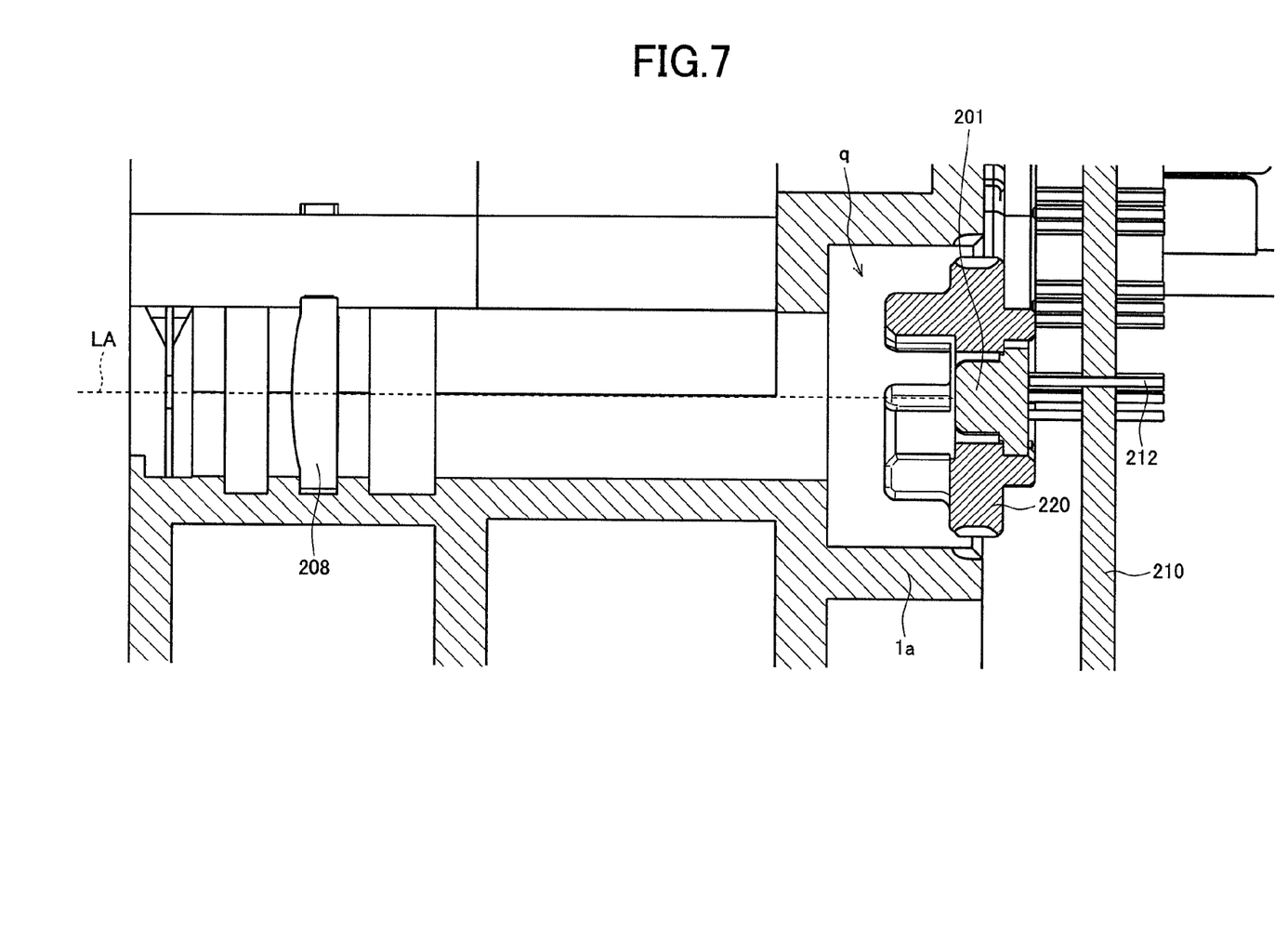
FIG. 7 is a view for explaining a configuration of a portion to which a laser diode is attached.
Figure 8:
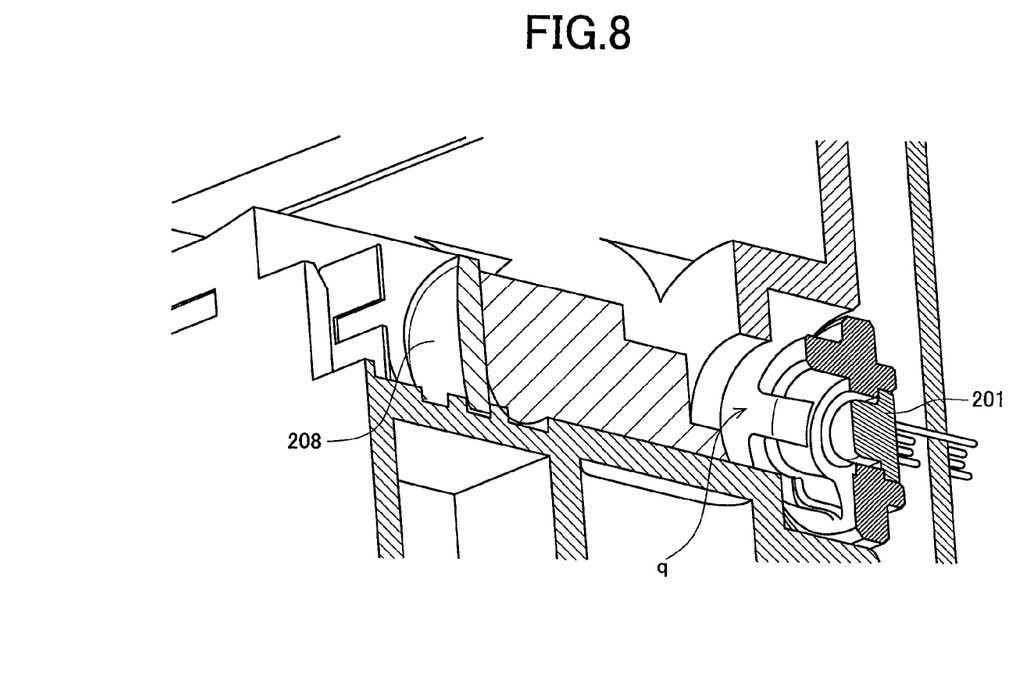
FIG. 8 is another view for explaining a configuration of a portion to which a laser diode is attached.

FIGS. 7 and 8 are views for explaining a configuration of a portion to which a laser diode is attached, where FIG. 7 is a view showing a side sectional configuration of a portion to which a laser diode is attached and FIG. 8 is another view for explaining a configuration of a portion to which a laser diode is attached, showing cross-sectionally main portions such as a housing, an LD holder, an LD lighting control board and a laser diode.

The laser diode 201 (201a to 201d) is attached to an opening q provided in the housing 101 using the LD holder 220. The attachment is performed by an adhesive agent (ultraviolet curing resin) applied so as to couple an outer circumferential surface of the LD holder 220 and a wall surface of the opening q.

A pin (leg) 212 provided in the laser diode 201 is soldered to the LD lighting control board 210. The light flux having a light axis LA emitted from the laser diode 201 is converted to parallel light by the collimator lens 208.

Figure 9A:
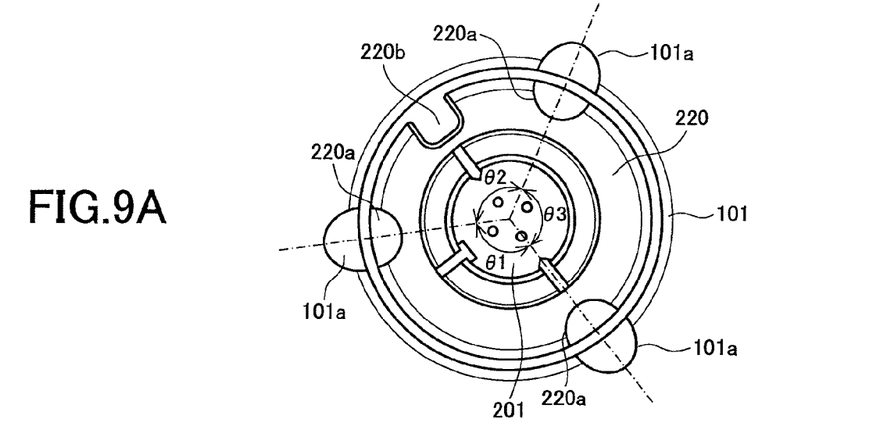
FIGS. 9A to 9C are still other views for explaining a configuration of a portion to which a laser diode is attached.
Figure 9B:
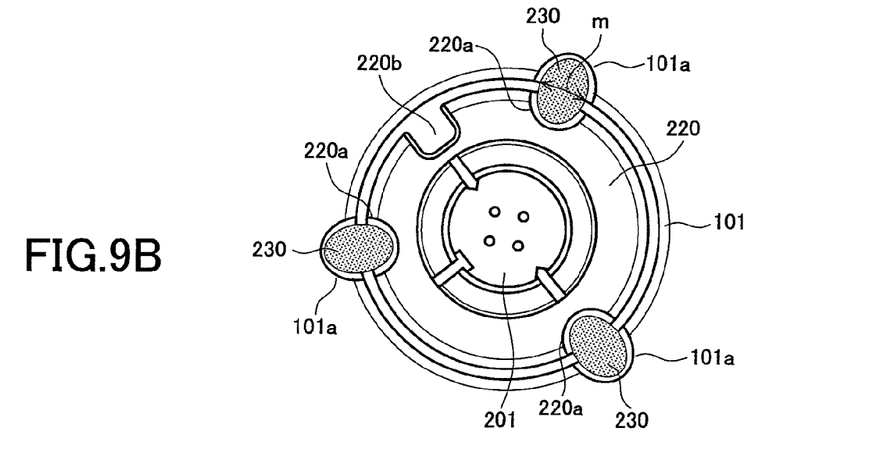
Figure 9C:
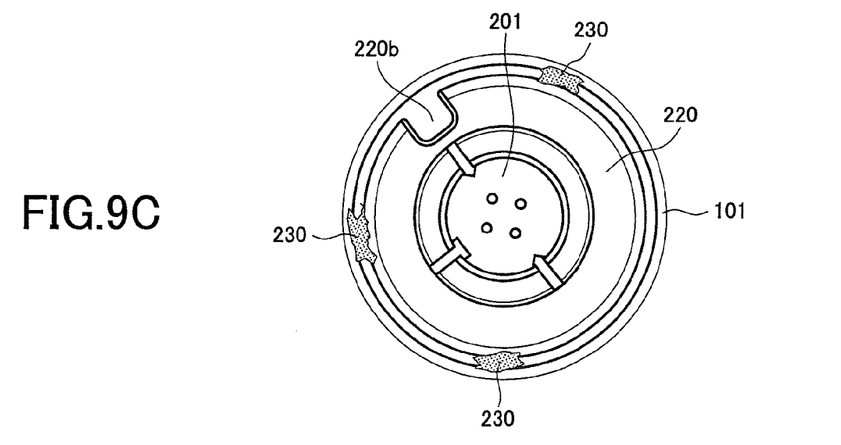

FIGS. 9A to 9C are other views for explaining a configuration of a portion to which a laser diode is attached, where FIG. 9A is a view showing an exemplary configuration of an LD holder and a housing in an embodiment of the present invention, FIG. 9B is a view showing a form when an adhesive agent is applied in the configuration of FIG. 9A, and FIG. 9C is a view showing a conventional configuration as a comparative example.

As shown in FIG. 9C, in the conventional configuration, the LD holder 220 holding the laser diode 201 is arranged in the opening of the housing 101, and is fixed to the housing 101 by applying the ultraviolet curable resin adhesive 230 in a state where alignment is performed. At this time, with a form where the LD holder 220 and the wall surface of the opening of the housing 101 are coupled, the adhesive agent 230 is applied at a plurality of positions (three positions in the examples of FIGS. 9A to 9C) in the uncured state, to which ultraviolet rays are irradiated for curing and fixing.

In the case of the conventional configuration, when the adhesive agent 230 is applied so as to couple the LD holder 220 and the housing 101, a center part of the coupling portion has a narrowed shape due to surface tension of the adhesive agent 230. The stress concentration is caused at the narrowed part so that adhesive strength with respect to the housing 101 of the LD holder 202 is reduced.

In an embodiment according to the present invention, as shown in FIG. 9A, recesses 220a and 101a are provided at predetermined positions of the outer circumferential surface of the LD holder 220 and the wall surface of the opening of the housing 101. That is, a plurality of recesses 220a are provided at positions of the LD holder 220 where the adhesive agent is applied. In addition, the recesses 101a are also provided in the housing 101 so as to face each of the recesses 220a of the LD holder 220. Moreover, the adhesive agent 230 is applied to these recesses 220a and 101a to couple the housing 101 and the LD holder 220. The state where the adhesive agent 230 is applied is as shown in FIG. 9B.

The recesses 220a and 101a are recesses whose outer edges have concave inner sides and the outer edges of the recesses 220a and 101a at least partially have a shape extending toward the coupling portion between the LD holder 220 and the housing 101.

In this example, the outer edges of the recesses 220a and 101a have a bowl shape surrounded by a curved line. When the adhesive agent 230 is received in the recesses 220a and 101a, the adhesive agent 230 is formed into an oval shape due to surface tension, because longer than ever before in the direction shown by an arrow m becomes and a contact area of the adhesive agent 230 to each of the recesses 220a and 101a becomes larger, and thus, adhesive strength by the adhesive agent 230 is possibly improved. In addition, by applying the adhesive agent 230 to the recesses 220a and 101a, the adhesive agent 230 is not extended even when applying the adhesive agent and workability becomes excellent.

Moreover, as to the position at which the recess is provided, as shown in FIG. 9A, all angles theta-1, theta-2 and theta-3 formed by respective adjacent straight lines, among straight lines connecting a light emitting point of the laser diode 201 fixed to the LD holder 220 and each center of the recesses 220a and 101a, preferably have the same angle. Thereby, even when cure shrinkage of the adhesive agent 230 is caused by irradiation of ultraviolet rays, balancing the cure shrinkage prevents position variation of the laser diode 201 and makes it possible to fix the laser diode 201 at a correct position. As the adhesive agent applied to the present invention, for example, "3015F" by ThreeBond Co., Ltd is usable.

Note that, the LD holder 220 is provided with a groove 220b to which no adhesive agent is applied. The groove 220b is provided for inserting a jig (not-shown) to adjust the position of the laser diode 201 with respect to the housing 101. Here, the jig is inserted into the groove 220b and the LD holder 220 is moved in two directions of the plane and the focus direction (direction of the collimator lens 208 in FIG. 7) and is rotated to adjust the position of the laser diode 201.

Figure 10A:
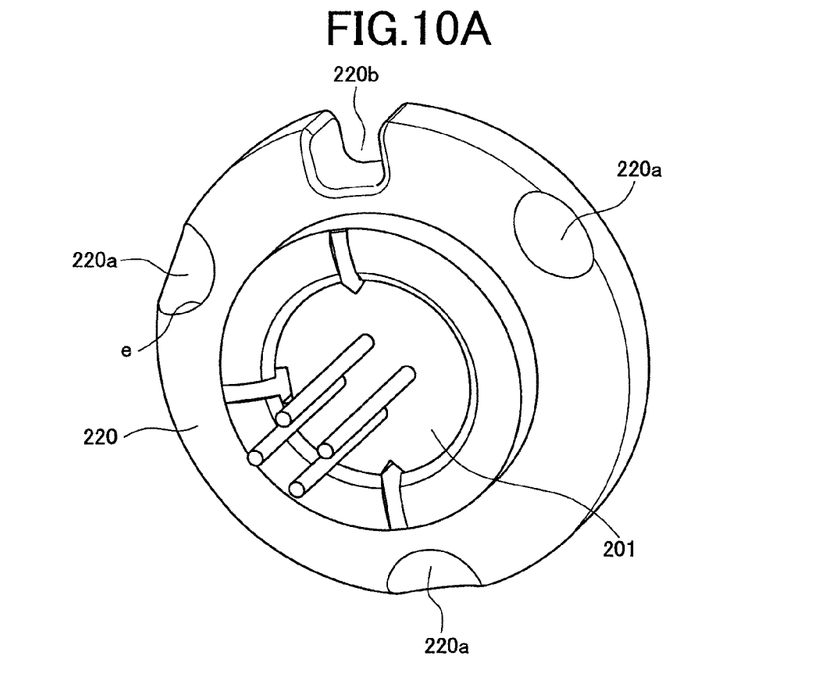
FIGS. 10A and 10B are perspective views for explaining a shape of a laser diode holder.
Figure 10B:
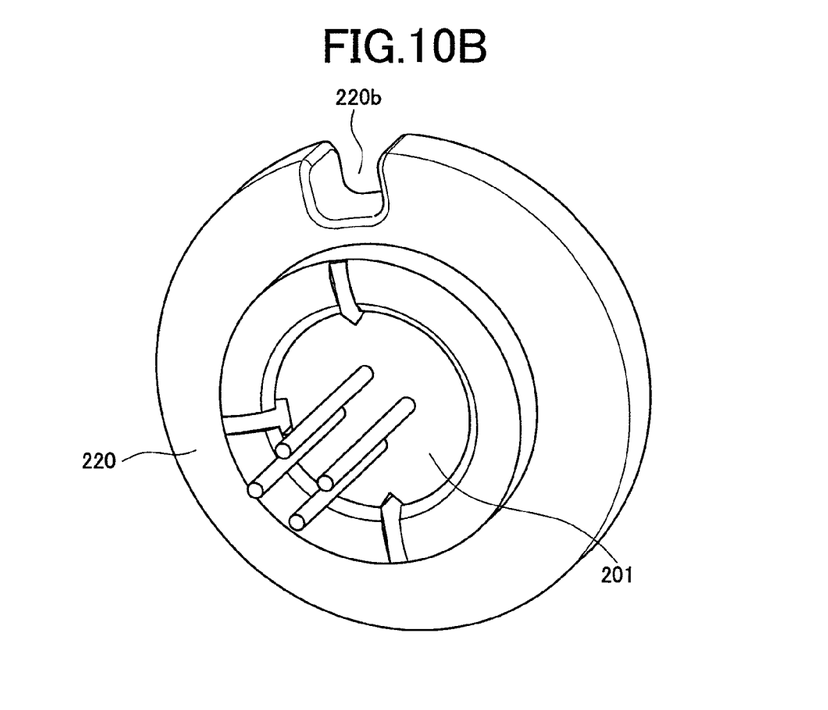

FIGS. 10A and 10B are perspective views for explaining a shape of the LD holder, where FIG. 10A is a view showing the LD holder of an embodiment of the present invention and FIG. 10B is a view showing a conventional LD holder for comparison. As shown in FIG. 10A, in the present embodiment, the recess 220a provided in the LD holder 220 has an oval shape and concave shape like a bowl, and an outer edge e thereof at least partially has a shape extending toward the coupling portion. By applying the adhesive agent 230 to this part, it is possible to improve adhesive strength even when the amount of the adhesive agent is the same as the conventional amount.

Figure 11A:
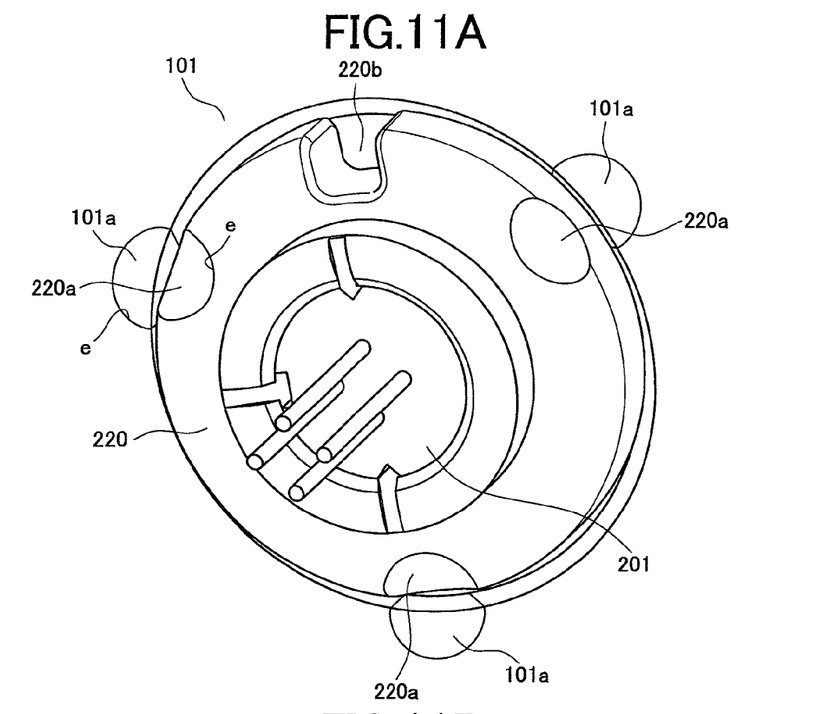
FIGS. 11A and 11B are perspective views showing an exemplary configuration of the LD holder and the housing according the present invention.

FIGS. 11A and 11B are perspective views showing an exemplary configuration of the LD holder and the housing according the present invention. As shown in FIG. 11A, the recess 101a is also provided in the housing 101 so as to be aligned with the position of the recess 220a of the LD holder 220. In this example, the recess 101a on the housing 101 side also has an oval shape and concave shape like a bowl, and an outer edge e thereof at least partially has a shape extending toward the coupling portion.

Figure 11B:
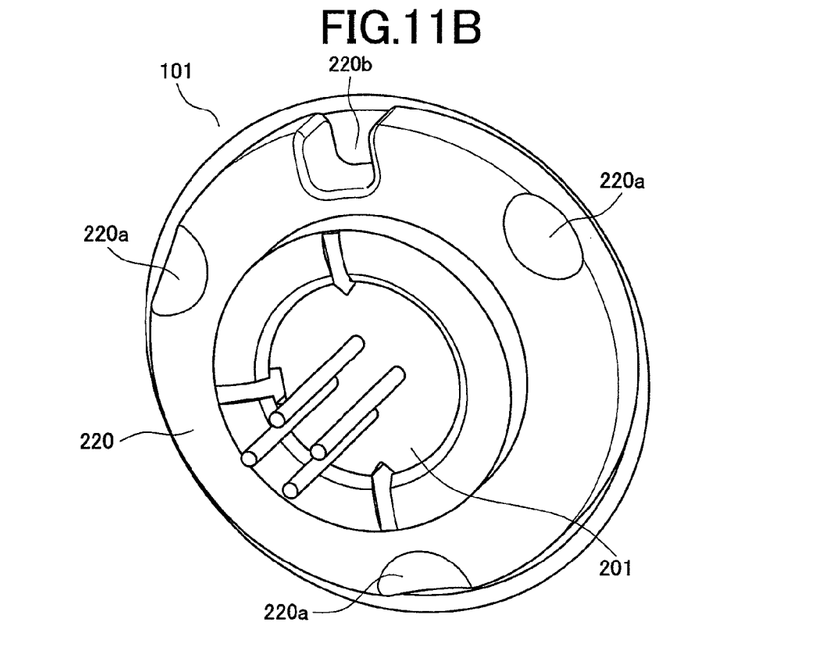

Moreover, as shown in FIG. 11B, it maybe configured such that the recess for applying the adhesive agent 230 is provided only in either the housing 101 or the LD holder 220. In the example of FIG. 11B, the housing 101 is not provided with the recess 101a as shown in FIG. 11A and only the LD holder 220 is provided with the recess 220a. By applying the adhesive agent 230 to the part of the recess 220a, it is possible to obtain an effect for improving adhesive strength compared to the conventional configuration.

In this case, it may be configured such that the recess 101a is provided not on the LD holder 220 side but only in the housing 101.

Figure 12A:
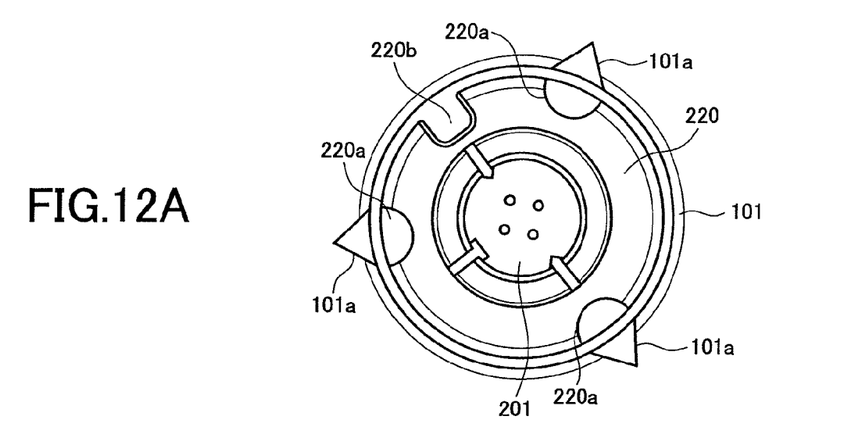
FIGS. 12A to 12C are views showing another exemplary configuration of the LD holder and the housing according the present invention.
Figure 12B:
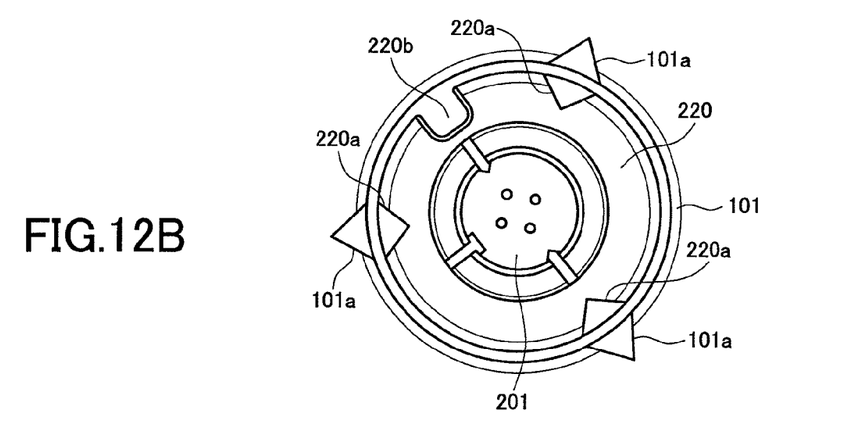
Figure 12C:
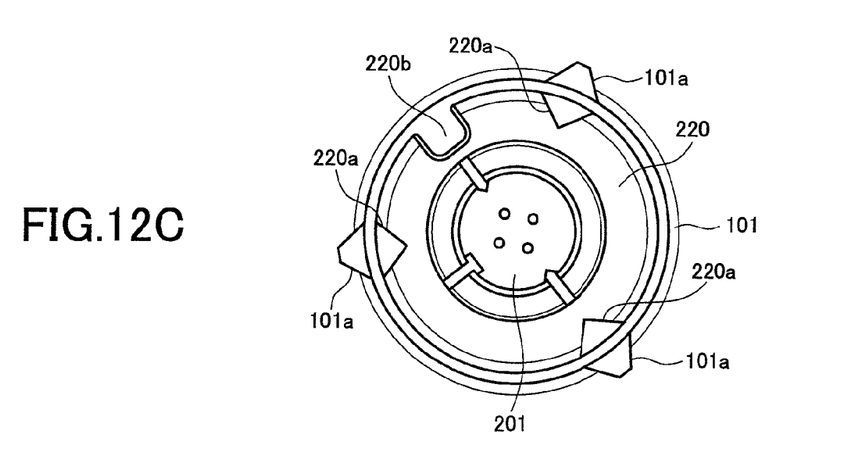

FIGS. 12A to 12C are views showing another exemplary configuration of the LD holder and the housing according the present invention. The recesses provided on the outer circumferential surface of the LD holder 220 and the wall surface of the opening of the housing 101 may have various shapes as appropriate. In this case, the outer edge of the recess needs to have a shape extending toward the coupling portion so that a center part of the coupling portion does not become narrow, but the shape of the outer edge may be adapted as appropriate as far as satisfying such a condition.

For example, as shown in FIG. 12A, the recess 101a of the housing 101 may be formed so that the outer edge thereof has a shape including at least two sides of a triangle. In this example, the recess 220a of the LD holder 220 may have a concave shape like a bowl in the same manner as in the above example. Moreover, it may be configured such that the recess 220a having the outer edge including two sides of the above triangle is provided in the LD holder 220 and the recess 101a of the housing 101 is formed into a bowl shape.

In the exemplary configuration of FIG. 12B, both the recesses 220a and 101a of the LD holder 220 and the housing 101 are formed so that the outer edges thereof have a shape including at least two sides of a triangle. Moreover, in the exemplary configuration of FIG. 12C, the recess 220a of the LD holder 220 is formed so that the outer edge thereof has a shape including two sides of a triangle, and the recess 101a of the housing 101 is formed so that the outer edge thereof has a shape including at least three sides of a trapezoid. These examples show the exemplary configuration of the shape of the recess, and in the embodiment according to the present invention, the shape of the recesses provided in the housing 101 and the LD holder 220 is not limited to the above examples, and for example it is possible to provide the recess for the adhesive agent 230 in one or both of the housing 101 and the LD holder 220 and it is also possible to adapt the shape of the recess as appropriate. Further, in this case, the recess provided in the LD holder 220 and the recess provided in the housing 101 may have the different shape.

In addition, in the embodiment according to the present invention, one or both of the LD holder 220 and the housing 101 configured as described above is able to be made of a transparent material. When the transparent material is used, it is possible that at least a part of the LD holder 220 is made of the transparent material and at least a part of the wall surface of the opening provided with the LD holder 220 is made of the transparent material in the housing 101. As the transparent material, for example, a resin material such as polycarbonate or acryl is usable.

Conventionally, the housing 101 of the optical scanning unit 1 is generally made of a black material so that stray light is not generated due to reflected light from source light and incident light from outside. In the embodiment according to the present invention, a part of one or both of the LD holder 220 and the housing 101 is made of the transparent material, so that when irradiating ultraviolet rays to the ultraviolet curable resin adhesive, the ultraviolet rays easily reach deep into the application portion of the adhesive agent and it is possible to surely cure the adhesive agent in a short time.

Figure 13:
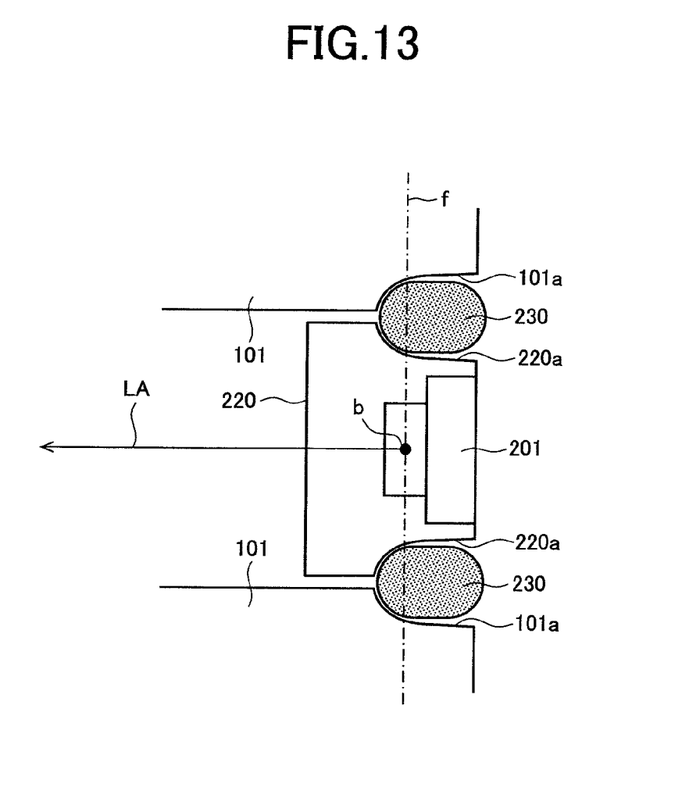
FIG. 13 is a view for explaining an application state of an adhesive agent applied to a gap between the laser diode holder and the housing.

FIG. 13 is a view for explaining an application state of the adhesive agent applied to a gap between the LD holder and the housing. At a portion where the LD holder 220 is attached to the opening of the housing 101, the adhesive agent 230 is applied so as to couple the outer circumferential surface of the LD holder 220 and the wall surface of the opening of the housing 101. The recess 220a is provided on the outer circumferential surface of the LD holder 220 and the recess 101a is provided on the wall surface of the opening of the housing 101. Note that, as described above, the recess maybe provided in either the LD holder 220 or the housing 101. In addition, the adhesive agent 230 is applied to the recesses 220a and 101a and cured.

At this time, the recesses 220a and 101a are arranged at the position intersecting a surface f which includes a light emitting point b of the laser diode 201 and which is orthogonal to the light axis LA of the light flux emitted from the laser diode 201. Thereby, the adhesive agent 230 is applied to the position intersecting the surface f, and even when cure shrinkage caused by irradiating the adhesive agent with ultraviolet rays or expansion of the adhesive agent caused by a rise of temperature while using the optical scanning unit or the like occurs, the position of the laser diode 201 will not be shifted to the light axis direction. In addition, by arranging the recesses 220a and 101a in a well-balanced manner, it is possible to hold the position of the laser diode 201 in the direction of the face f at the predetermined position. Such a configuration makes it possible to improve accuracy of fixation of the position of the laser diode 201.

As has been described above, according to the present invention, it is possible to provide an optical scanning unit having a configuration for adhering and fixing a laser diode holder serving as an optical part to a holding portion, which is configured such that sufficient supporting strength of the laser diode holder is given without unnecessarily increasing an amount of an adhesive agent and a solidification time of the adhesive agent, and an image forming apparatus provided with the optical scanning unit.

In particular, according to the present invention, a recess for applying the adhesive agent is provided in one or both of the laser diode and the holding portion and an outer edge of the recess at least partially has a shape extending toward a coupling portion between the laser diode holder and the holding portion, so that the adhesive agent bridged between the laser diode holder and the holding portion has a center part being thick due to surface stress to have an oval shape and the stress concentration is not generated in the bridged portion. Thereby, sectional strength of the adhesive agent becomes high and adhesive strength is improved because of no occurrence of stress concentration by an external force, and it becomes possible to reduce an amount and a solidification time of the adhesive agent.

The invention claimed is:

1. An optical scanning unit comprising:
a laser diode holder to which a laser diode is fixed; and
a holding portion for holding the laser diode holder, in which the laser diode holder is fixed to the holding portion by applying an adhesive agent to couple an outer circumferential surface of the laser diode holder and a wall surface of an opening provided in the holding portion, wherein
each of the outer circumferential surface of the laser diode holder and the wall surface of the opening has a recess at a portion to which the adhesive agent is applied,
at least one of the recess of the outer circumferential surface of the laser diode holder and the recess of the wall surface of the opening has such a shape that an inner side of an outer edge of the recess is concaved into the outer edge,
the outer edge at least partially has a shape extending toward a coupling portion between the laser diode holder and the holding portion, and the adhesive agent is applied to the recess, and
a width of the recess at the coupling portion in a circumferential direction of the outer circumferential surface of the laser diode holder is the same as a width of the recess at the coupling portion in the circumferential direction of the wall surface of the opening.

2. The optical scanning unit as defined in claim 1, wherein the outer edge has a shape surrounded by a curved line.

3. An image forming apparatus comprising:
the optical scanning unit as defined in claim 2.

4. The optical scanning unit as defined in claim 1, wherein the outer edge has a shape formed by using at least straight lines including at least two sides of a triangle.

5. An image forming apparatus comprising:
the optical scanning unit as defined in claim 4.

6. The optical scanning unit as defined in claim 1, wherein the outer edge has a shape formed by using at least straight lines including at least three sides of a trapezoid.

7. An image forming apparatus comprising:
the optical scanning unit as defined in claim 6.

8. The optical scanning unit as defined in claim 1, wherein a shape of the recess provided in the outer circumferential surface of the laser diode holder and a shape of the recess provided in the wall surface of the opening of the holding portion are the same.

9. An image forming apparatus comprising:
the optical scanning unit as defined in claim 8.

10. The optical scanning unit as defined in claim 1, wherein at least one of a part of the laser diode holder and at least a part of the holding portion is made of a transparent material.

11. An image forming apparatus comprising:
the optical scanning unit as defined in claim 10.

12. The optical scanning unit as defined in claim 1, wherein each of the outer circumferential surface of the laser diode holder and the wall surface of the opening has a plurality of recesses, and all angles formed by respective adjacent straight lines among straight lines connecting a light emitting point of the laser diode fixed to the laser diode holder and each center of the plurality of recesses are the same.

13. An image forming apparatus comprising:
the optical scanning unit as defined in claim 12.

14. The optical scanning unit as defined in claim 1, wherein the recess is provided at a position intersecting a surface which includes a light emitting point of the laser diode and which is orthogonal to a light axis of light flux emitted from the laser diode.

15. An image forming apparatus comprising:
the optical scanning unit as defined in claim 14.

16. An image forming apparatus comprising:
the optical scanning unit as defined in claim 1.

17. An optical scanning unit comprising:
a laser diode holder to which a laser diode is fixed; and
a holding portion for holding the laser diode holder, in which the laser diode holder is fixed to the holding portion by applying an adhesive agent to couple an outer circumferential surface of the laser diode holder and a wall surface of an opening provided in the holding portion, wherein
one or both of the outer circumferential surface of the laser diode holder and the wall surface of the opening has a recess at a portion to which the adhesive agent is applied,
the recess has such a shape that an inner side of an outer edge of the recess is concaved into the outer edge, and
the outer edge at least partially has a shape extending toward a coupling portion between the laser diode holder and the holding portion, and the adhesive agent is applied to the recess, and
wherein the recess is provided in both of the outer circumferential surface of the laser diode holder and the wall surface of the opening of the holding portion, and a shape of the recess provided in the outer circumferential surface of the laser diode holder and a shape of the recess provided in the wall surface of the opening of the holding portion are the same.

18. An image forming apparatus comprising:
the optical scanning unit as defined in claim 17.

* * * * *